United States Patent

[11] 3,599,410

[72] Inventors Frans J. de Coene
Zedelgem;
Daniel C. C. Dewaele, Beselare, both of, Belgium
[21] Appl. No. 834,731
[22] Filed June 19, 1969
[45] Patented Aug. 17, 1971
[73] Assignee Sperry Rand Corporation
New Holland, Pa.
[32] Priority June 28, 1968
[33] Belgium
[31] 48078

[54] ADJUSTABLE MOUNTING FOR A REEL ON A HEADER
1 Claim, 6 Drawing Figs.
[52] U.S. Cl. .................................................. 56/221
[51] Int. Cl. ............................................... A01d 57/04
[50] Field of Search........................................ 56/219- —225

[56] References Cited
UNITED STATES PATENTS
3,283,487  11/1966  Jarvis ..................... 56/222
FOREIGN PATENTS
1,180,697  1/1959  France ..................... 56/219
838,601   6/1960  Great Britain............. 56/220

Primary Examiner—Louis G. Mancene
Assistant Examiner—J. N. Eskovitz
Attorneys—Joseph A. Brown, John C. Thompson and James J. Kennedy ABSTRACT: A header for an agricultural harvester has a rotatable reel supported on the header by two adjustable mounting mechanisms and two positioning jacks to move the reel in a horizontal fore-and-aft direction by a slidable movement and in a vertical direction by a pivotal movement about a shaft extending transversely to the rear of the reel.

PATENTED AUG 17 1971

INVENTORS
Frans J. Decoene
BY Daniel C.C. Dewaele

George C. Bower
ATTORNEY

ADJUSTABLE MOUNTING FOR A REEL ON A HEADER

BACKGROUND OF THE INVENTION

This invention relates to agricultural header with reels and is particularly directed to the adjustable mounting of the reel on the header for setting the reel over a range of horizontal and vertical positions.

It is very desirable to be able to adjust the position of a header reel over a range of settings depending on crop conditions such as height of the crop, type of crop and inclination of the crop to the ground. The reel should be adjustable vertically as well as over a range of fore-and-aft horizontal positions. Headers have been manufactured with reels that are adjustable vertically as well as forwardly and rearwardly. These have the shortcoming that the only vertical positioning of the reel is done by hydraulic means. The fore-and-aft horizontal adjustment is done by manual means or by a separate set of hydraulic jacks. The double adjustment by the two sets of hydraulic jacks is complex and expensive as well as difficult to position the reel.

The purpose of this invention is to simplify the means for controlling and positioning of the reel by means of a linkage system supporting the reel on the header.

OBJECTS AND SUMMARY OF THE INVENTION

An object of this invention is to variably support a reel on a header for easy and simple control over a range of horizontal and vertical positions by a single set of jacks.

Another object of this invention is to provide a simple and inexpensive adjustable header reel support means having a single set of jacks vertically and horizontally positioning the reel.

In summary an adjustable support means for a reel on an agricultural header comprises two linkage means at opposite sides of a header operated respectively by two jacks with each linkage means having a lever and reel supporting arm pivotally mounted about a transverse axis extending parallel to and rearward of the reel and having a rod pivotally connected to the lever at one end and slidably connected to the arm at the other end by a sleeve carrying one of the reel bearings and with a respective jack being connected to a respective lever separate from the other pivotal connections for horizontally moving the reel fore-and-aft before or subsequent to the rotative vertical movement about the rearward transverse axis.

DETAILED DESCRIPTION OF PREFERRED EMBODIMENT

Figure 1:
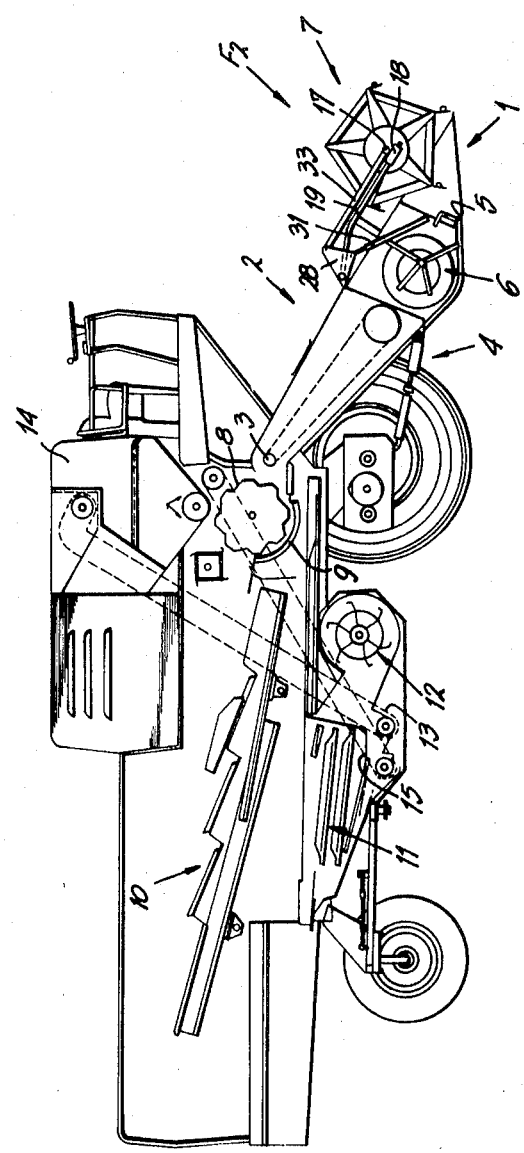
FIG. 1 is a side view of a combine with a feed elevator and header mounted thereon.

In FIG. 1, the combine has a header 1 mounted on a straw elevator 2. The straw elevator with the header is rotated about axis 3 by two jacks 4. The header has a header frame including an auger trough and sidewalls, cutting means conventionally in the form of a sickle 5, an auger 6, and a reel 7 mounted on top of the header frame.

The other principal parts of the combine are a threshing drum 8, a concave 9, shaking devices 10, grain sieves 11, a fan 12 to separate the chaff and the grain, a grain elevator 13 to convey grain to the grain tank 14 and the tailings elevator 15 to carry back the tailings to the threshing mechanism 8 and 9.

Figure 2:
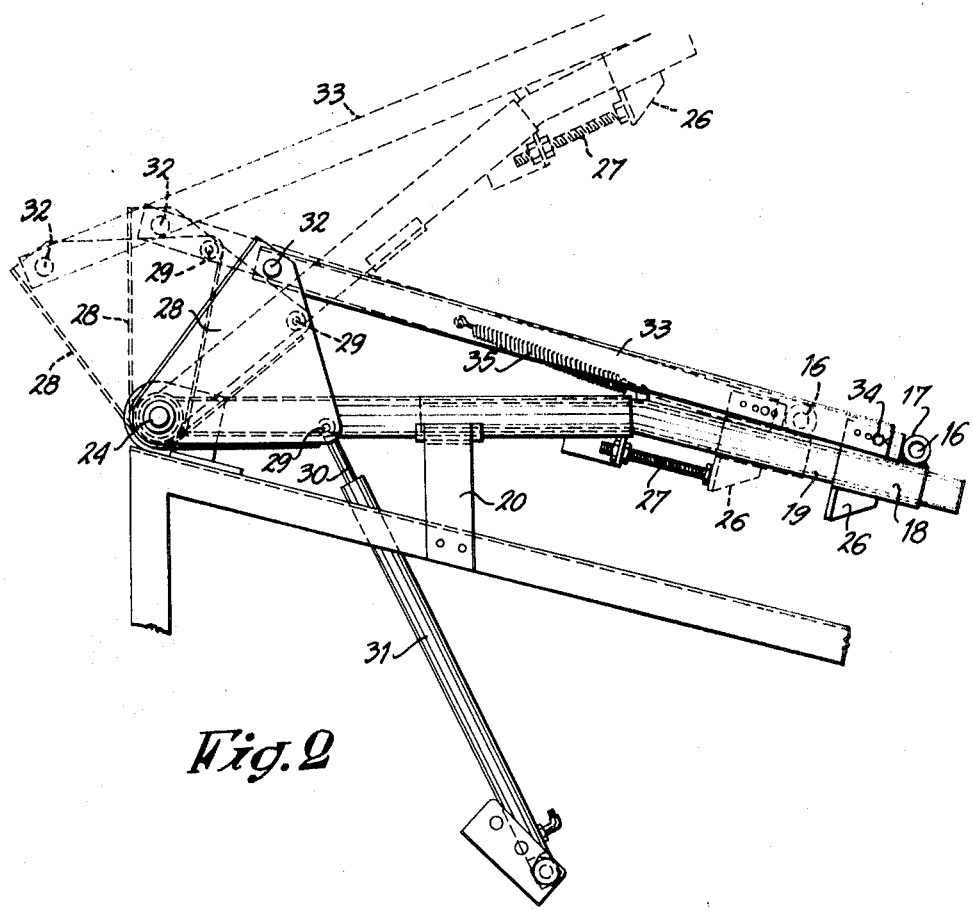
FIG. 2 is a side view of one of the reel positioning means.
Figure 3:
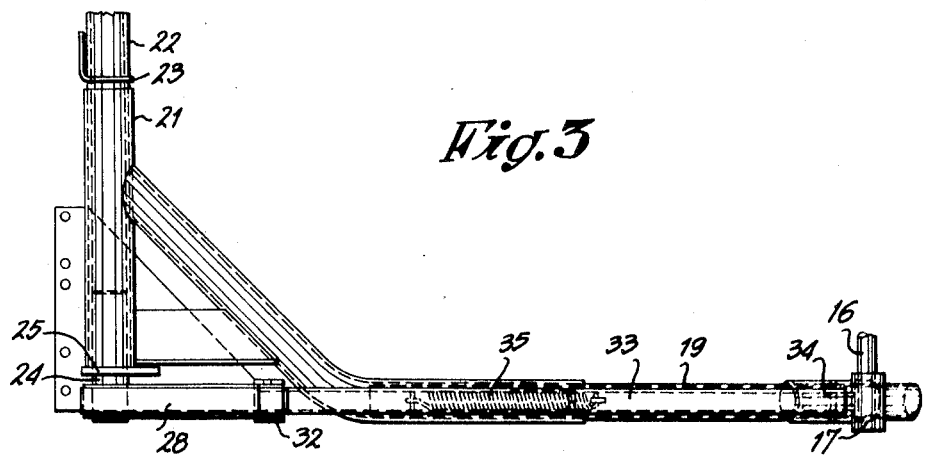
FIG. 3 is a top view of the right linkage means.
Figure 4:
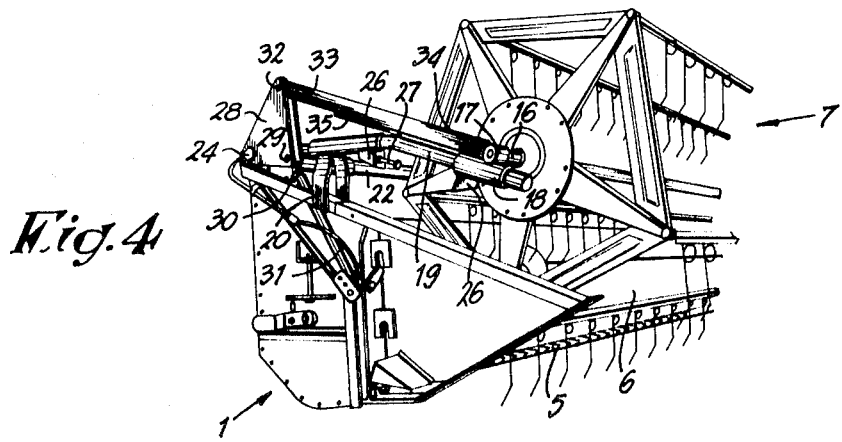
FIG. 4 is a fragmentary perspective view of the right end of the header with the reel in the lower forward position.
Figure 5:
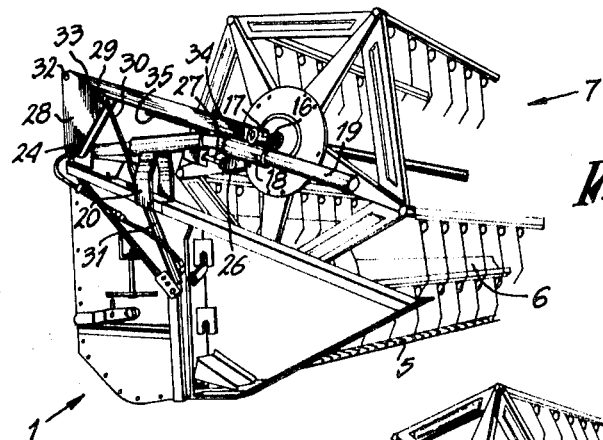
FIG. 5 is a fragmentary perspective view of the right end with the reel end in a rearward retracted position.

As represented in the drawings the reel 7 has a shaft 16 mounted at each end in bearings 17 to freely rotate the reel 7. The bearing 17 is fixedly mounted on a slide bushing or sleeve 18 which is mounted to freely rotate and slide on a reel arm 19. When the reel is in its lowest and forward position, as shown in FIGS. 2 and 4, these arms 19 rest on supports 20 on each sidewall of the header 1.

At the back end, the reel arms 19 are fixedly attached to a tube 21 which is freely rotatable on a tubular shaft 22. The latter is freely rotatable, on one hand, in supports 23 which are fastened to the frame of the header. On the other hand, welded shaft ends 24 extend into opposite ends of the tubular shaft 22 and by supports 25 are also connected with the frame of the header.

Each bushing 18 is provided with a fixed stop 26, and each reel arm 19 is provided with an adjustable projection 27 which cooperates with stop 26. It is a matter of fact that such stop means can be formed in a number of ways, for instance, by providing the reel arm 19 with several holes for receiving a suitable pin that is removable from the reel arm in order to form an adjustable stroke. In such case the stop 26 is formed by the adjacent end of a slide bushing 18.

On each of the aforesaid shaft ends 24, a triangular lever 28 is welded at one of its corners. These levers 28 turn together with the tubular shaft 22. At a second corner, the lever 28 is rotatably connected by the spindle 29 to the rod of an actuating positioning means or jack. The actuating member 31 of the jack is hingedly connected with the corresponding sidewall of header 1. The lever, at third top corner, is hingedly connected by a spindle 32 with a rod 33. The other end of rod 33 is attached to the slide bushing 18 by a spindle 34. Finally, each reel arm 19 is connected by a spring 35 with the rod 33.

The adjustment of reel 7 in accordance with the invention is very simple and is as follows. When reel 7 is raised from the position as represented in FIG. 4, into a higher or more rearward position, the jack is actuated. The lever 28 will rotate round the axis of the tubular shaft 22. The firm mounting of the levers 28 on the common shaft 22 insures that the movement of each end of the reel is the same. When levers 28 rotate upwards, the rods 33 are pulled backwards and the bushings 18 slide on the reel arms 19 and shift the reel 7 linearly backward. The springs 35 are stressed during the movement of reel 7.

Figure 6:
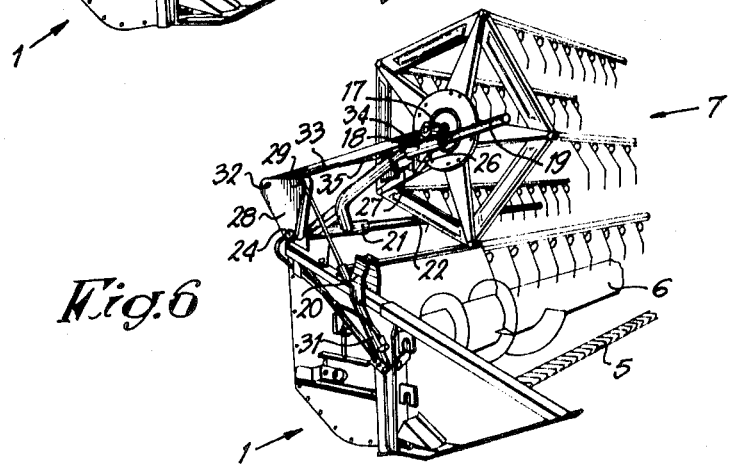
FIG. 6 is a fragmentary perspective view with the reel in a raised position.

When the stops 26 engage the projections 27, the relative movement between the slide bushings 18 and the reel 19 is terminated. Due to the triangular shape of lever 28 it rotates further to the rear and the reel arms 19 will rotate round the tubular shaft 22 to a final position as represented in FIG. 6.

In order to lower reel arm 7, the pressure of the jack is removed. The weight of reel 7 and the distention of the springs 35 draws the reel 7 back in the position of FIG. 4. On the forward movement of reel 7, the double-acting jack is used. The reel 7 can be set at any intermediate position between the positions as represented in FIGS. 4 and 6.

The actuating positioning means connected between the lever 28 and the header may be a rack and pinion jack or a hydraulically or pneumatically operated jack with the rod 30 forming the piston rod and the actuating member 31 being the cylinder with the actuating fluid. The rod 30 may be a screw actuated by driving means such as an electric motor represented by the actuating member 31. The actuating means may be single or double acting.

In this manner, the reel is adjusted by a linkage mechanism that is very simple and operated by a single set of jacks. An economical and inexpensive structure is obtained with a reel adjustment is very easy and simple to control and to examine.

While this invention has been described in connection with a single embodiment, it will be understood that this embodiment is capable of modification and that this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. In combination with a header having a header frame, cutting means on the header frame, and a reel; an adjustable mounting for supporting the reel on the header frame comprising: forwardly extending arm means pivotally interconnected with said header frame, lever means, means pivotally mounting said lever on said header frame concentric with the pivotal interconnection of said arm means, extensible and retractable means operable to rotate said lever means between a first position and a second position as said extensible and retractable means is moved between its retracted and extended positions wherein a portion of the lever remote from said pivotal mounting means moves through an intermediate position between forward and rearward positions, respectively, rod means pivotally secured to the remote portion of the lever means and extending forwardly therefrom, means rotatably mounting said reel upon the forward end of said rod means, means slideably mounting the forward end of the rod means on said arm means for forward and rearward sliding movement, and stop means limiting the rearward sliding movement of the rod means relative to said arm means, the parts being so arranged and constructed that as the remote portion of the lever means moves from the forward position to the intermediate position said reel will slide upwardly and rearwardly until said stop means limits rearward sliding movement and as the remote portion of said lever means moves from the intermediate position to its rearward position said reel will swing upwardly and rearwardly with said arm means about the point of pivotal interconnection of said arm means with said header frame.